United States Patent [19]

Marks et al.

[11] 4,055,954
[45] Nov. 1, 1977

[54] DAMPER ACTUATOR FOR A VENTILATION SYSTEM

[75] Inventors: Ronald Aaron Marks, Canoga Park; George Levenback, Studio City; Albert Sweet, Northridge, all of Calif.

[73] Assignee: Elster's Inc., Hollywood, Calif.

[21] Appl. No.: 582,090

[22] Filed: May 30, 1975

[51] Int. Cl.² ............................................. F03G 7/06
[52] U.S. Cl. .................................. 60/527; 98/40 VT
[58] Field of Search ................. 60/527, 231, 516, 528; 251/11; 98/40 R, 40 VT; 137/468

[56] References Cited

U.S. PATENT DOCUMENTS

| | | | |
|---|---|---|---|
| 1,783,574 | 12/1930 | Lawler | 98/40 VT |
| 2,117,529 | 5/1938 | Wile et al. | 98/40 VT |
| 2,380,935 | 8/1945 | Boyle | 98/40 R X |
| 3,029,595 | 4/1962 | Sherwood | 60/527 |
| 3,836,073 | 9/1974 | Evans | 98/40 VT X |
| Re. 22,870 | 4/1947 | Peple, Jr. | 98/40 R |

*Primary Examiner*—Allen M. Ostrager
*Attorney, Agent, or Firm*—Spensley, Horn & Lubitz

[57] ABSTRACT

A damper actuator for use in a ventilation system typically used in an air conditioning system to activate the damper or damper assembly in response to an electrical signal. More particularly, a heat motor rotatably coupled at one end to a lever or lever assembly and rotatably coupled at its other end to a stationary frame. A spring may also be coupled to the lever or lever assembly and to the frame when necessary to provide a force to return the lever or lever assembly to its initial position or configuration. By means of a rotatable coupling at each end of the heat motor, stresses transverse to the longitudinal axis of the heat motor, are substantially eliminated and the operational life of the heat motor is significantly increased.

10 Claims, 6 Drawing Figures

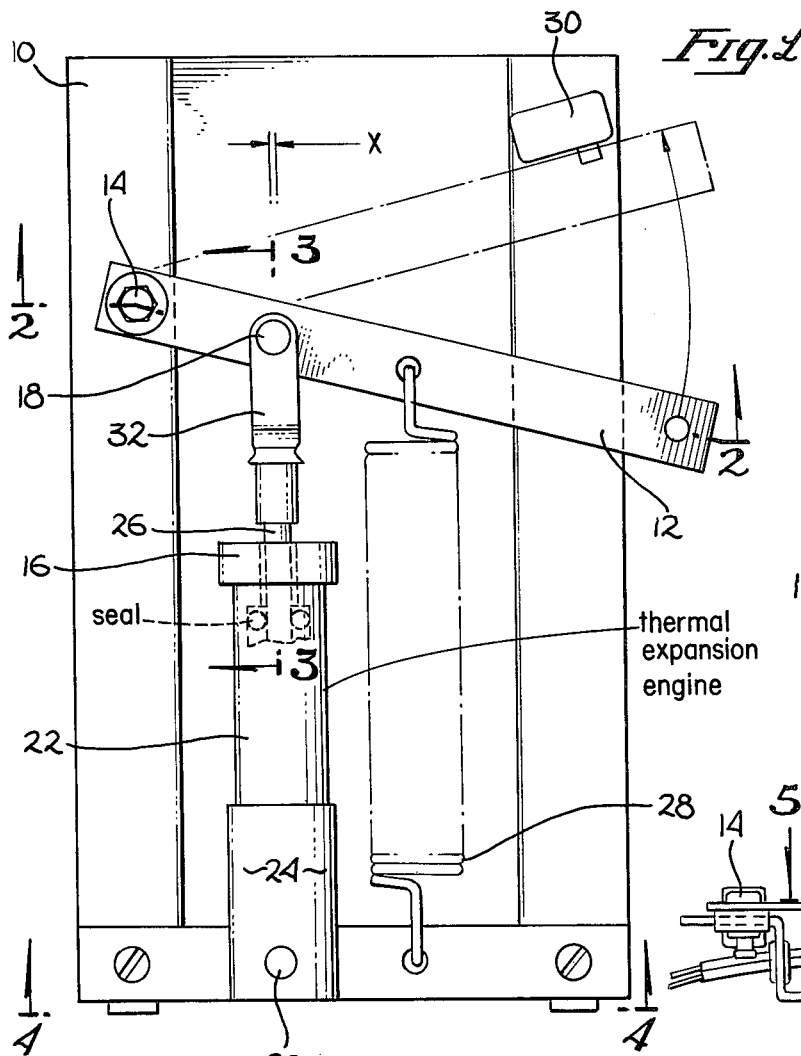
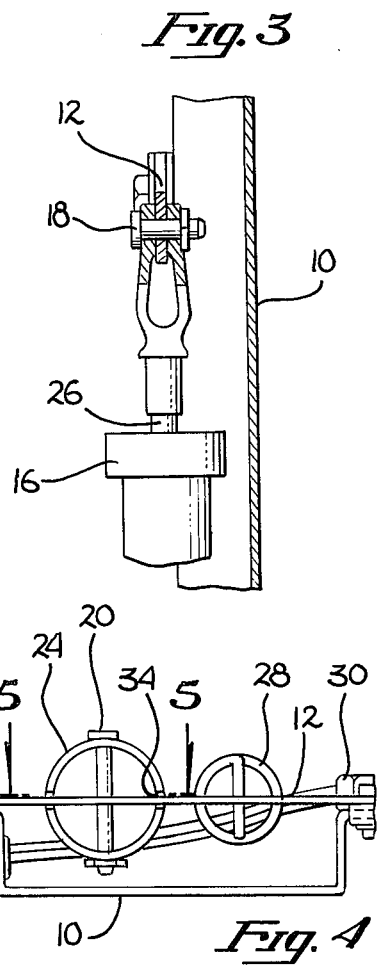
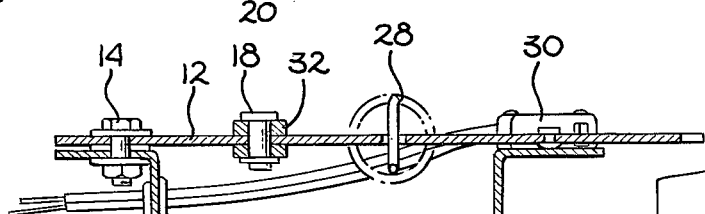
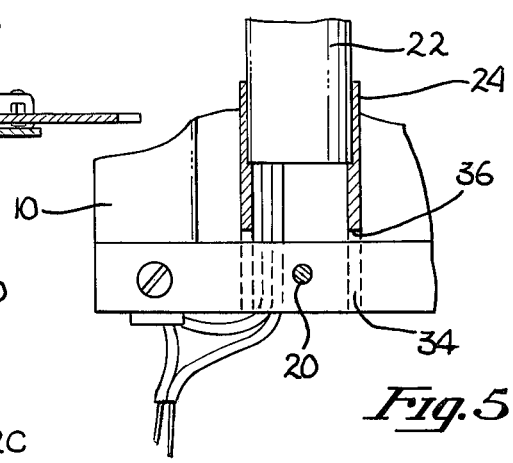
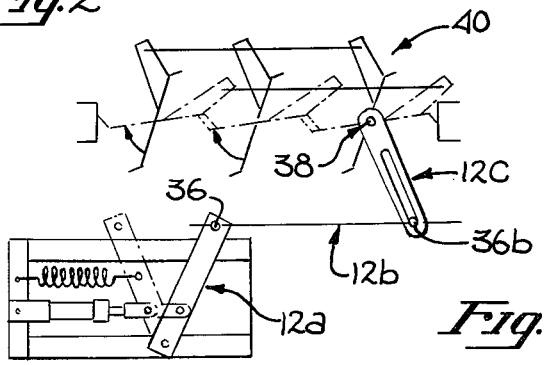

DAMPER ACTUATOR FOR A VENTILATION SYSTEM

BACKGROUND OF THE INVENTION

1. Field of the Invention

The present invention relates to the field of ventilation and air conditioning apparatus, and particularly to air conditioning apparatus which is commonly used in connection with dampers or damper assemblies used to control the flow of air in the air conditioning system.

2. Description of the Prior Art

A damper typically is a flat blade disposed at the ingress or egress of a ventilation duct to control the amount of air flowing past a given point. The damper typically functions as a throttle plate. One or more dampers may be combined by means of levers, gears and other mechanical linkages to cooperatively operate as a damper assembly. Typically, the entire damper assembly is driven by rotating a single axis or rod which in turn is coupled to the assembly. Given the combined frictional resistance and air pressure, against which a damper assembly must operate, a significant amount of torque is required to efficiently drive the damper assembly. On the other hand the speed in which the damper assembly is driven or activated is usually not of consequence since the limiting time factor is the thermal time constant of the overall ventilation system. Therefore, the prior art has typically coupled various types of electric motors to the driving axis of the damper assembly by means of various types of torque convertors, usually gear reduction boxes. This combination is: (1) relatively expensive; (2) prone to mechanical failure due to the large number of mechanical parts and due to their complexity; and (3) tends to require relatively large amounts of electrical power to activate the dampers. What is needed then is a damper actuator which is capable of delivering large forces or torques without undue mechanical complexity, with high reliability, and small power requirements.

Summary of the Invention

The present invention comprises an actuator for activating a damper or damper assembly in a ventilation system, which actuator has: (1) a frame assembly; (2) an engine means rotatably coupled at one of its ends to the frame assembly; and (3) a lever means rotatably coupled to the frame assembly. The other end of the engine means is rotatably coupled to the lever means such that the engine means is doubly pivoted in order to substantially eliminate all stresses applied to the engine means which are perpendicular to the longitudinal axis of the engine means. The longitudinal axis is defined by a line through the point of rotatable coupling between the engine means and the frame assembly and the point of rotatable coupling between the engine means and lever means. In appropriate embodiments a spring means may be added which is coupled between the lever means and the frame assembly such that a force is exerted on the lever assembly to return it to its initial position or configuration when the engine means is not activated.

More particularly, the present invention is a damper actuator having a doubly pivoted heat motor. One end of the heat motor is rotatably coupled or pivoted by a mounting to the frame assembly. The other end of the heat motor is rotatably coupled or pivoted to the lever which is also rotatably coupled to the frame assembly. The point of coupling between the heat motor and the lever swings through an arc as the lever is rotated. Due to the rotatable couplings, the heat motor is free to change its inclination with respect to the frame assembly. As a result of this feature the amount of stress applied to the heat motor in a direction perpendicular to an axis, defined by the points of the coupling between the heat motor and the lever, and the heat motor and frame assembly, is substantially eliminated. A coil spring may likewise be coupled between the lever and the frame assembly to provide a return force causing the lever to return to an initial position when the heat motor is not activated.

BRIEF DESCRIPTION OF THE DRAWING

FIG. 1 is a plan view of the damper actuator showing the engine means, the lever means, the frame assembly and the spring means.

FIG. 2 is a cross sectional view of the lever means taken through Section 2—2 of FIG. 1. FIG. 2 illustrates one way in which the rotational couplings may be made between the heat engine and the lever.

FIG. 3 is a cross sectional view taken through Section 3—3 of FIG. 1 showing one embodiment of the coupling between the engine means and the lever means.

FIG. 4 is a cross sectional view taken through Section 4—4 of FIG. 1 showing the rotational coupling between the mounting and the frame assembly.

FIG. 5 is a cross sectional view taken through Section 5—5 of FIG. 4 showing one embodiment of the rotational coupling between the mounting and the frame assembly.

FIG. 6 is a diagramatic view of the damper actuator illustrating a typical method of linking the actuator with a damper assembly.

DESCRIPTION OF THE PREFERRED EMBODIMENTS

The present invention is a damper actuator for use in a ventilating system comprising a frame assembly, an engine means for applying a force in response to a signal activating the engine means, and a lever means rotatably coupled to the frame assembly for delivering the force from the engine means to a damper or damper assembly. In addition there is a spring means for providing a force to return the lever assembly to its initial position or configuration when the engine means is not activated. The engine means is rotatably coupled at one of its ends to the frame assembly and at the other of its ends to the lever means. The spring means is coupled between the lever means and frame assembly while the lever means is rotatably coupled to the frame assembly. The present invention may be better understood, together with its various embodiments, by referring to FIGS. 1 through 6.

The lever means, the engine means, the frame assembly, and the spring means is illustrated in plan view in FIG. 1.

In the embodiment illustrated, a frame assembly 10 serves as the structural basis to which the various elements of the actuator are referenced. A lever means 12 is illustrated in FIG. 1 as a simple lever rotatably coupled at one end 14 to frame assembly 10. In particular, rotatable coupling 14 may be a simple pivot pin. An engine means 16 is illustrated as rotatably coupled to lever 12 by a coupling 18 and as rotatably coupled to frame assembly 10 by a coupling 20. Engine means 16 in turn is comprised of a heat motor 22 and a mounting 24. Heat motor 22 is a thermal expansion engine well known to the art and may be of the type described in U.S. Pat. Nos. 3,193,600; 3,194,911; 3,029,595; and 3,376,631. In general, such heat motors operate on the principal that when a material is heated or changes state it undergoes a volume expansion. Heat motor 22 has an internal structure similar to an ordinary thermometer, i.e. a relatively large reservoir holding a material which is free to expand into an elongated cylindrical cavity. In particular, the working material within heat motor 22 may be paraffin which is induced to change state in response to an electrical heating element thermally coupled to a reservoir holding the paraffin. When the paraffin is heated and changes state from a solid to a liquid, the expanding paraffin enters an elongated and generally cylindrical cavity in which a piston has been disposed. The piston provides a tight seal between the walls of the elongated cylindrical cavity and the piston body. As a result the piston is forced along the elongated cylindrical cavity with considerable force by means of the expanding paraffin. In FIG. 1 only the exterior of heat motor 22 is illustrated and a portion of the piston rod 26 which extends into heat motor 22. It is to be understood that any heat motor may be used in the present invention, and that a paraffin heat motor is referred to only for the purposes of illustration.

In many instances a spring means 28 is coupled between frame assembly 10 and lever means 12. In many applications the area of the piston within the heat motor 22 is relatively small while the torque required to move lever means 12 in either direction is relatively large. Therefore in many cases, as the working material within the heat motor 22 cools and contracts, the atmospheric pressure exerted against the piston of heat motor 22 is insufficient to develop enough force to return lever means 12 to its initial position. Therefore, spring means 28 is provided to produce a return force which urges lever means 12 to its initial position or configuration. Lever means 12 is shown in FIG. 1 in its initial position. Its most extreme final position is illustrated in FIG. 1 in phantom outline. A microswitch 30 is attached to frame assembly 10 to provide a limit stop to lever means 12. Microswitch 30 is electrically coupled to the heating element within heat motor 22 in such a manner that when lever means 12 activates microswitch 30, the heating element within heat motor 22 is disabled.

In a typical embodiment incorporating a paraffin based heat motor 22 the diameter of the piston within heat motor 22 is approximately 5/16th of an inch. With this type of heat motor, a force of 250 lbs. can be exerted on lever means 12 at the point of rotatable coupling 18. When approximately 24 volts AC or DC (30 watts) is applied to the heating element of heat motor 22, the actuator illustrated in FIG. 1 may completely open within 5 minutes or less. Using a relatively stiff coil spring for spring means 28, lever means 12 returns to its initial position within 5 to 15 minutes. It can readily be appreciated that the nature of the opening and closing cycles of the actuator illustrated in FIG. 1 can be varied by choosing various types of heat motors utilizing various power inputs as well as chosing various types of springs possessing different spring constants.

It is to be particularly noted that heat motor 22 is pivoted at both of its ends 18 and 20. Therefore, as lever means 12 rotates from the initial to its final position, rotatable coupling 18 will travel through an arcuous path. If heat motor 22 were not rotatably coupled by means of rotatable coupling 20 a substantial transverse stress would be applied to piston rod 26. In cases where heat motor 22 has been rigidly coupled to frame assembly 10 the transverse stresses have ruptured the seal between the piston and the elongated cylindrical (piston) cavity within heat motor 22, even for relatively small amounts of lever rotation. When heat motor 22 is doubly pivoted, as disclosed herein, the only transverse stress applied to piston rod 26 is that due to the very slight frictional drag present at rotatable couplings 18 and 20. Therefore, the present invention substantially eliminates all transverse stresses to piston rod 26. The transverse force applied to piston rod 26 by means of the arcuous path followed by rotatable coupling 18, serves only to rotate heat motor 22 about rotatable coupling 20. Further detail in regard to rotatable couplings 18 and 20 may be understood by viewing FIGS. 2 through 5.

For example, FIG. 2 is a cross section through Section 2—2 of FIG. 1 and shows the nature of the rotatable coupling to lever means 12. Rotatable coupling 14 is a simple pivot pin disposed through lever means 12 in frame assembly 10. The pivot pin may be of any type well known to the art such as a smooth pin fixed at each end with a cotter pin or simply a nut, lock washer and bolt. Similarly, rotatable coupling 18 is a simple pivot pin extending through a clevis 32 and lever means 12.

FIG. 3 illustrates clevis 32 in greater detail. Clevis 32 is clearly illustrated as coupling piston rod 26 to lever means 12 by means of a simple pivot pin 18. Any rotatable means, well known to the art may be used to couple piston rod 26 to lever means 12, and clevis 32 is illustrated only as one example.

FIG. 4 is a cross sectional view of mounting 24 taken through Lines 4—4 of FIG. 1. In one embodiment heat motor 22 has a substantially cylindrical shape. Therefore, mounting 24 is a cylindrical collar which may be slipfit onto heat motor 22. FIG. 5 illustrates that mounting 24 is split so that it straddles an edge portion of frame assembly 10. Again mounting 24 is coupled to frame assembly 10 by means of rotatable coupling 20 which is a simple pivot pin. FIG. 5 illustrates another feature of mounting 24 by showing a cross sectional view of FIG. 5 taken through Section 5—5. Heat motor 22 is shown as coupled to mounting 24 by means of internal shoulders machined into the inner diameter of mounting 24. A slot 34 is similarly machined into the lower portion of mounting 24 such that mounting 24 may freely rotate about rotatable coupling 20 through all positions obtainable by heat motor 22. Free rotational motion of heat motor 22 may be assured by simply providing sufficient clearance 36 between mounting 24 and frame assembly 10.

Finally by way of illustration only, FIG. 6 shows a diagramatic view of one embodiment of the present invention coupled to a damper assembly 40. The lever means is shown as a simple lever 12a, of the type which is illustrated in FIG. 1, which is rotatably coupled at its free end to a rigid rod 12b by means of a rotatable coupling 36a. The other end of rigid rod 12b is rotatably coupled by means of a rotatable coupling 36b to one end of a damper assembly lever 12c. The other end of a lever 12c is fixed to the driving axis or rod 38 of a damper assembly. Using a 30 watt paraffin based heat engine as in the embodiments disclosed herein and the linkages illustrated in FIG. 6, a torque of approximately 28 ounce-inches may be conveniently delivered to axis 38.

Therefore, a novel damper actuator capable of delivering large amounts of torque without requiring complex mechanical torque converters, having high reliability, and efficiently utilizing electrical power has been disclosed. Such an actuator overcomes the deficiencies of prior art devices. It is to be understood that further modifications and alterations may be made in the present invention by one with ordinary skill in the art without departing from its spirit and scope.

We claim:

1. In a ventilation system, an actuator to control the flow of fluid in said ventilation system comprising:
a frame assembly;
an engine means having a first and second end, and having a piston and a body member, said piston being movable within said body member and having a seal between said body member and piston, said first end being rotatably coupled to said frame assembly, said second end being movable with respect to said frame assembly, said engine means for applying a force by displacing said second end with respect to said first end in response to a signal activating said engine means; and
a lever means being rotatably coupled to said frame assembly, said second end of said engine means being rotatably coupled to said lever means, for delivering said force from said engine means to control flow of fluid within said ventilation system, said rotatable couplings of said first and second ends of said engine means substantially reducing stresses on said seal in a direction perpendicular to an axis extending through said first and second ends of said engine means.

2. The actuator of claim 1 further comprising;
a spring means having a first and second end, said first end coupled to said frame assembly and said second end coupled to said lever means said spring means for providing a force to return said lever means to an initial configuration when said engine means is nonactivated.

3. The actuator of claim 2 wherein:
said engine means is a thermal expansion engine;
said signal actuating said engine means is electrically generated heat; and
said spring means is a coil spring.

4. The actuator of claim 1 wherein said engine means is a thermal, expansion engine and said signal activating said engine means is electrically generated heat, said engine means comprising:
a heat motor forming said second end of said engine means;
a mounting forming said first end of said engine means rotatably coupled to said frame means and coupled to said heat motor; and
said heat motor is displaced through a plurality of positions by a force transversely applied to an axis extending through said heat motor and mounting.

5. The actuator of claim 4 wherein:
said heat motor has a generally cylindrical shape; and
said mounting is a cylindrical collar rigidly engaging said heat motor and being rotatably coupled to said frame assembly so as to freely rotate through said plurality of positions of said heat motor.

6. The actuator of claim 5 wherein:
said mounting has a slot, an edge portion of said frame assembly is disposed within said slot, and a pivot pin is transversely disposed to said slot, said pivot pin extending through an edge portion of said frame assembly; and
said heat motor is rotatably coupled to said lever means by means of a clevis pin.

7. The actuator of claim 6 wherein:
said mounting has an internal shoulder to restrain said heat motor within said mounting, said mounting being slip fit onto said heat motor.

8. The actuator of claim 7 further comprising:
a coil spring coupled between said lever means and said frame assembly to provide a force to return said lever means to an initial configuration when said heat motor is nonactivated.

9. In a ventilation system, an actuator for activating a damper to control the flow of air in said ventilation system comprising:
a frame assembly;
a heat motor activated by an electrical heating element, having a piston, body member and seal between said piston and body member;
a mounting rigidly engaging said heat motor and being rotatably coupled to said frame assembly to freely rotate through a plurality of positions of said heat motor;
a lever rotatably coupled to said frame assembly, said piston of said heat motor rotatably coupled to said lever; and
a spring coupled between said lever and said frame assembly to provide a force to return said lever to an initial position when said heat motor is nonactivated wherein the rotatable couplings to said piston, and body member substantially eliminates all transverse stresses on said seal.

10. The actuator of claim 9 wherein:
said mounting is coupled to said frame assembly by a pivot pin;
said lever is coupled to said frame assembly by a pivot pin; and
said piston of said heat motor is coupled to said lever by a clevis pin.

* * * * *